United States Patent
Gonzalez Leon et al.

(10) Patent No.: US 8,048,943 B2
(45) Date of Patent: Nov. 1, 2011

(54) BITUMINOUS COMPOSITIONS

(75) Inventors: Juan Antonio Gonzalez Leon, Lyons (FR); Gilles Barreto, Messimy (FR); Lionel Grampre, Sainte Foy les Lyons (FR)

(73) Assignee: Ceca S.A., La Garenne Colombes (FR)

( * ) Notice: Subject to any disclaimer, the term of this patent is extended or adjusted under 35 U.S.C. 154(b) by 0 days.

(21) Appl. No.: 12/735,810

(22) PCT Filed: Feb. 20, 2009

(86) PCT No.: PCT/EP2009/052026
§ 371 (c)(1),
(2), (4) Date: Sep. 28, 2010

(87) PCT Pub. No.: WO2009/103783
PCT Pub. Date: Aug. 27, 2009

(65) Prior Publication Data
US 2011/0009533 A1  Jan. 13, 2011

(30) Foreign Application Priority Data
Feb. 20, 2008 (EP) .................................... 08101807

(51) Int. Cl.
*C08L 95/00* (2006.01)
(52) U.S. Cl. .......................................... 524/60; 524/62
(58) Field of Classification Search ............... 534/60–62
See application file for complete search history.

(56) References Cited

U.S. PATENT DOCUMENTS
2010/0135940 A1* 6/2010 Grimaldi et al. ................ 424/62

FOREIGN PATENT DOCUMENTS
| EP | 0 416 682 | * | 8/1990 |
| EP | 0416682 | A | 3/1991 |
| WO | 2006/087475 | A | 8/2006 |
| WO | 2008/029065 | A | 3/2008 |

OTHER PUBLICATIONS

Evdokimov, I. N., et al. (2002) "Effect of Asphatenes on the Thermal Properties of Petroleum and Bitumen Emulsions" Chemistry and Technology of Fuels and Oils, 38(6):375-380.
Golubev, et al. (2007) "Observations and Morphological Analysis of Supermolecular Structure of Natural Bitumens by Atomic Force Microscopy" Fuel, 87(1):32-38, ISSN: 0016-2361.
Gol'Denberg, D. N. et al. (1969) "Supramolecular structures of polymer-bituminous compositions" retrieved from STN Database accession No. 1970:91953 & Uzbekskii Khimicheskii Zhurnal, 13(5), 31-3 CODEN: UZKZAC.
Bochko, E. A., et al. (1972) "Structure Formation in Resin Modified Bitumen and Polymer-based Plugging Mortars" retrieved from STN Database accession No. 1972:435776 & Vestnik Moskovskogo Universiteta, Seriya 4: Geologiya, 27(1), 60-4 CODEN: VMUGAR; ISSN: 0579-9406.
Brunsveld, et al. (2001) "Supramolecular Polymers" Chemical Reviews, 101:4071-4097, ISSN: 0009-2665.
Rakotondradany, Feleniaina (2004) "Introduction to Supramolecular Chemistry and Its Implications to Bitumen Behaviour" Oilsands Symposium 2004, [Online] May 3-5, 2004. University of Alberta. Retrieved from the Internet: URL:http://www.ualberta.ca/dept/chemeng/oilsands/Presentations%20in%20PDF/May%204%20-%20PM/Felaniana%20Rakotondradany.pdf> [retrieved on Mar. 26, 2009].
Arkema (2007) "Arkema Annual and Sustainable Development Report 2007"[Online]Retrieved from the Internet: URL:http://www.arkema.com/sites/group/en/corporate/annual_reports/docs/all.pdf> [retrieved on Mar. 26, 2009].
International Search Report received in PCT/EP2009/052026 mailed Apr. 8, 2009.

* cited by examiner

*Primary Examiner* — Peter Szekely
(74) *Attorney, Agent, or Firm* — Smith, Gambrell & Russell, LLP

(57) ABSTRACT

This invention relates to the modification of bitumen by polymeric materials used particularly for the preparation of asphalt mixtures with enhanced mechanical properties, wherein the polymeric materials are selected from additives capable of forming a supramolecular assembly. The modified bitumen may be used for the fabrication of asphalts mixtures with mineral aggregates used in construction or maintenance of sidewalks, roads, highways, parking lots or airport runaways and service roads and any other rolling surfaces.

16 Claims, 1 Drawing Sheet

BITUMINOUS COMPOSITIONS

FIELD OF INVENTION

This invention relates to the modification of bitumen by polymeric materials used particularly for the preparation of asphalt mixtures with enhanced mechanical properties. In particular, the present invention relates to compositions of bitumen with additives capable of forming a supramolecular assembly that confers enhanced mechanical properties to the mixture and their applications. Examples of such applications are the fabrication of asphalts mixtures with mineral aggregates used in construction or maintenance of sidewalks, roads, highways, parking lots or airport runaways and service roads and any other rolling surfaces.

BACKGROUND

Bitumen or asphalt is the heaviest portion from the oil distillation process. Due to the different origins and distillations processes of such oils, the resulting bitumen may have a wide range of properties and characteristics. In the present invention, bitumen refers not only to the product from oil by direct distillation or from distillation of oil at reduced pressures, but as well the product coming from the extraction of tar and bituminous sands, the product of oxidation and/or fluxation of such bituminous materials, as well as blown or semi-blown bitumens, synthetic bitumens (such as described in FR 2 853 647 A1), tars, oil resins or indene-coumarone resins mixed with aromatic and/or paraffinic hydrocarbons and the mixtures of such.

The main application for bitumen is in asphalt mixtures where the bitumen is mixed with mineral aggregates that can be of different size, shape and chemical nature. These asphalt mixtures are particularly used for construction or maintenance of sidewalks, roads, highways, parking lots or airport runaways and service roads and any other rolling surfaces. In the present invention mineral aggregates are the product from quarries as well as aggregates recuperated from previous asphalt mixtures (as described in the AFNOR XP P98-135, December 2001), products from building demolition and their mixtures. Other common components in asphalt mixtures are organic and inorganic fibers, such as glass, metal or carbon fibers, as well as, cellulose, cotton, polypropylene, polyester, polyvinyl alcohol and polyamide fibers.

The mixing process for the fabrication of asphalt mixtures using the composition described in this invention, can take place by different methods that may be grouped into three main categories based on their fabrication temperatures: processes at room temperature, processes with a fabrication temperature above 100° C. and processes at temperatures between room and 100° C.

The asphalt mixture fabrication processes taking place at room temperature, depend on methods that provide enough fluidity to the bitumen at such temperatures. One of such methods can be, for example, the one based on the addition of volatile solvents to the bitumen. This would allow the proper coverage of the aggregates by the solubilized bitumen at room temperature, and its proper laying and compaction. However, large quantities of volatile solvents are required which pollutes the atmosphere when evaporated. This technique is pretty much vanished since the use of volatile solvents can be avoided by the use of other techniques.

Another process that allows the production of an asphalt mixture at room temperatures conditions is the one that uses an emulsion or dispersion of bitumen in water as a mean to make it fluid. The asphalt mixtures fabricated by this process have the advantage that no thermal treatment is required for the aggregates and practically no polluting emissions are generated. This process can be combined with the technique mentioned above which uses volatile solvents added into the bitumen prior to the emulsification or dispersion. Nevertheless, the mechanical properties obtained by this method are, in general, lower that the ones obtained by hot mixing methods, where the aggregates are used dried after a thermal treatment above 100° C. Bitumen emulsions and dispersions are commonly used for example to produce grave emulsion, storable cold mixes, cold wearing courses like microsurfacing or like the ones produced with pugmills, transported with haul trucks and compacted with rollers and to waterproof surfaces.

The most commonly used method for the fabrication of asphalt mixtures is the one that takes place at temperatures above 100° C. At these temperatures, the bitumen can be fluid enough to properly cover the aggregate that is, in contrast to the previous methods at room temperature, dried during the heating process. The obtained hot asphalt mixtures have also to be laid and compacted at elevated temperature to guarantee their fluidity. The temperature at which the aggregates are heated is chosen to obtain proper evaporation of their moisture and to ensure an adequate fabrication temperature for the used bitumen. The fabrication temperature is set mainly by the viscosity of the utilized bitumen, the more viscous the bitumen the higher the fabrication temperature.

For example, in France, an asphalt mixture using bitumen with a penetration of 35/50 is generally fabricated at a temperature of 150° C. to 170° C. and laid at 140° C. (as recommended by Eurobitume). This hot asphalt mix process is widely used due to its simplicity and robustness, since the main parameter to control is the fabrication temperature. However, a substantial amount of heat goes to the heating and drying of the mineral aggregates (~90-96 wt % of asphalt mixture), which makes this an energetically expensive process that also releases a significant amount of undesired emissions.

Recently, there have been several developments for asphalt mixture fabrication at temperatures above room temperature but below 100° C. Examples of such processes are: the use of two different types of bitumen during fabrication (as in WO 97/20890), the introduction of a fraction of cold and wet aggregates during the mixing stage to create a fluid bitumen foam (as in EP 1 469 038 and EP 1 712 680), or the use of a bitumen/water emulsion to also produce a foam during mixing to achieve the aggregate covering (as in WO 2007/112335). These processes have several advantages, in particular on the reduction of energy consumed and polluting emissions generated, but they require substantial modification to the standard asphalt hot mixing equipment.

Other techniques exist and are known to those skilled in the art, like tack coat, cheap seal, surface dressing employing anhydrous bituminous binder or bitumen emulsions. The anhydrous bituminous binder or bitumen emulsion has to achieve cohesion very fast once sprayed over the surface to be treated so that the aggregates are not expelled upon mechanical action. One conventional solution is to use a volatile solvent mixed with the bitumen so that the solvent evaporation enables a cohesion increase. This is no longer seen as a long-term solution because of the related organic emissions. FR 2 768 150 proposes to use, admixed with bitumen, a non-volatile solvent that chemically reacts in contact with the oxygen of the air to get the right bitumen cohesion.

However, the cohesion-augmentation kinetics remains difficult to control and use is made of a metallic catalyst.

It is known by any person skilled in the art that polymers can be added to the bitumen in order to fabricate asphalt mixtures with enhanced mechanical properties. Polymers are large molecules formed by the chemical linkage of several repeating units or monomers. Modification of bitumen with polymers of high molecular weights (above ~10,000 g/mol) is generally required to improve the mechanical behavior of an asphalt mixture because the mechanical properties of bitumen are susceptible to temperature changes.

Although, there exist solutions to harden bitumen, that is, to increase the stiffness of the bitumen at high service temperature to avoid rutting, like for example by incorporating paraffins or polyphosphoric acid, these solutions are only partial because the high susceptibility of the modified bitumen remains, creating or even enhancing problems at low temperature like for example a lack of flexibility.

Hence polymer modification of bitumen is very often used to increase its low temperature flexibility, that is below the ambient temperature and down to about −40° C., and the same polymer modification increases the softening point of the bitumen. It can also increase the cohesion and stiffness of the bitumen at high service temperature and consequently that of the asphalt mixture made with it, improving its resistance to rutting. Examples of polymers commonly used in the modification of bitumen are: styrene butadiene rubbers, styrene/butadiene block copolymers, ethylene vinyl acetate copolymers, polyethylene and other alpha-polyolefins (see "Asphalt binder testing manual", Asphalt Institute 2007). The use of non-crosslinked low molecular weight polymers, also known as oligomers, or other small molecules cannot modify the bitumen in the manner as large polymers do.

Incorporating polymers into the bitumen, even at the low contents commonly used (from 2% to 6% of polymer) is not an easy task. Polymers and bitumen have at most only a partial compatibility that usually makes the polymer to phase separate from the bitumen overtime. In addition, due to the high viscosities of molten polymers, the mixing process requires high temperatures and long mixing times under vigorous agitation to achieve a good dispersion of the polymer in the bitumen. The required temperatures to achieve the dispersion of polymer into bitumen are generally higher than the usual storage and fabrication temperatures according to the nature of bitumen.

For example, U.S. Pat. No. 5,618,862 shows as an example that the dispersion of a styrene butadiene copolymer with a molecular weight of 100,000 daltons at 3.5% in bitumen with a penetration of 80/100 takes 2.5 hours at 175° C. to be homogeneous. For this kind of bitumen, a typical storage temperature is between 140 and 160° C. The higher temperatures required for dispersing the polymer in the bitumen may also prove detrimental to the bitumen properties since it would accelerate its oxidation. The addition of a crosslinking agent, such as a sulfur-containing compound, is also commonly used in polymer-modified bitumens to further increase the molecular mass of the dispersed polymer by forming a chemical network between the preexisting polymer molecules. Such network increases the viscosity of the bitumen even further but avoids phase separation. In addition, such sulfurous compounds combined with the high temperatures required to achieve the mixing present important safety issues during the modified bitumen fabrication process. The difficulty to prepare modified bitumen with polymers, make the process accessible only to bitumen refiners or large construction companies which are the only ones capable of making the considerable investment in the adequate mixing equipment.

The use of a modified bitumen in order to fabricate an asphalt mixture generally results in a change of the fabrication process relatively to the unmodified bitumen. In the case of emulsions, for example, the addition of polymer may limit the grade of bitumen used since the emulsification process with water limits the temperature at which the bitumen can be added. More viscous bitumen grades may be used to fabricate emulsions in water at higher than atmospheric pressures. However, this adds a certain complexity to the emulsion fabrication process. In the case of hot mix asphalt fabrication, higher temperatures for fabrication, laying and compaction are required when modified bitumen is used. The higher viscosity of polymer-modified bitumen, compared to the one of the pure bitumen, can also bring problems to processing methods at temperatures below 100° C. and higher than room temperature, reducing the overall asphalt mixture fluidity.

It is of practical interest if the modification of bitumen by a polymeric material can be done without a substantial increase in its fabrication temperature, compared to the pure bitumen, while still obtaining an enhancement in mechanical properties on the resulting asphalt mix.

Also, a temperature reduction during the polymer dispersion and asphalt mixture fabrication process is of practical interest because it would lead to several advantages. A reduction in the dispersion temperature, and/or in time, reduces the amount of bitumen oxidation and aging, extending the life of the final application, such as in an asphalt mix for a road. If such reduction in temperature is translated to the asphalt mixture fabrication process, it would reduce the amount of energy consumed during dispersion and, most importantly, during an asphalt mixture fabrication process. Decreasing the aggregates and bitumen temperatures during the asphalt mixture fabrication process will also significantly reduce the amount of polluting emissions, including $CO_2$ and other greenhouse effect gases.

There are several approaches to reduce the time and temperature necessary for the dispersion of polymers in bitumen. One of such approach is the addition of a solvent during the mixture, which can also be used to disperse the polymer before adding to the bitumen. The use of volatile solvents, as discussed above, is not a practical option due to the polluting effect and difficulty of using them at elevated temperatures. Other solvents could be used such as vegetable oils or their derivates. The use of such solvents in the production of modified bitumens for asphalt mixtures often leads to a softening of the material and an increase in rutting.

WO 2005/087869 describes a composition of polymer-modified bitumen using a mono-alkyl ester of a vegetable oil as solvent to facilitate mixing. In addition, an amide additive is also added to overcome the decrement in mechanical properties due to the addition of the alkyl ester. However, the addition of about 6% of rapeseed oil methyl ester, to previously dissolve the polymer as stated in one of the examples, would still make the mixture softer, resulting in a softer asphalt mixture. In addition, a temperature higher than 160° C. and 30 minutes of stirring is still required to incorporate the polymer solution to the bitumen with a penetration of 160/220. A typical storage temperature for this kind of bitumen when pure is between 130° C. and 150° C.

U.S. Pat. No. 6,156,113 describes another approach to enhance the mechanical properties of the final bitumen composition while maintaining low viscosities at fabrication temperatures. In this patent, fatty acid monoesters are added to the bitumen to reduce viscosity by a solvation effect at fabrication conditions while, by the addition of a metal catalyst, crosslinking of such esters takes place under application conditions. This process may take several days. Although this method allows for low viscosities at fabrication conditions and enhanced mechanical properties of the final asphalt mixture, the use of certain metal catalysts may be restrained due to their negative impact to environment and men.

FR 2 871 804 proposes the use of a polymer-bitumen mixture containing a high level of polymer, called a master batch. This mixture is prepared with an extrusion device and then diluted with bitumen to get the right polymer dosage in a short time. The drawback of the solution is that a special device is still necessary to mix the polymer and the bitumen to produce the master batch, resulting in a considerable economic investment.

Since the main problem with the addition of regular or conventional polymers into bitumen is their high viscosity, one solution would be to have a polymer with good mechanical properties at asphalt mixture application temperatures (about −20° C. to 70° C.) while having very low viscosity at elevated temperatures (above 100° C.). Such low viscosity at higher temperatures would make the dispersion of such polymer into the bitumen considerably easier under lower temperatures, milder mixing conditions and shorter mixing times. This would also result in an easier use of the modified bitumen thanks to the lower temperatures and or lower process duration.

Polymeric materials with such properties can be achieved by the use of oligomers or monomers than assembly into a supramolecular polymer-like structure with non covalent bonds at low temperatures but dissociate at high temperatures.

WO 01/07396 describes a polymer like material comprised of oligomers that can associate into large structures by means of hydrogen bonding between specific carboxylic acid and alcohol functional groups. The resulting material shows mechanical properties far superior to those of the original monomer, which increase with the number of associated functional oligomers. No application with bitumen is discussed in this text.

WO 03/059964 describes another supramolecular polymer based on a different chemistry. In this case, polymer-like properties are also achieved by the interconnection of the smaller molecules by hydrogen bonding. No application with bitumen is discussed in this text.

WO 2006/087475 describes an elastomeric material formed by the supramolecular assembly of smaller molecules. The rubber-like material of this invention becomes a liquid above a certain temperature due to the dissociation of the hydrogen bonds. The transition from elastic polymer to liquid is reversible in temperature. No application with bitumen is discussed in this text.

SUMMARY OF THE INVENTION

According to a first aspect, it is the matter of this invention a bituminous composition with mechanical properties similar to those achieved with conventional polymer-modified bitumens at final application conditions, comprising at least one component capable of forming a supramolecular assembly, said bituminous composition being in the form of a dispersion or a solution. Said component preferably is a supramolecular polymer.

Surprisingly, the bituminous composition of the invention has enhanced mechanical properties compared to that of the bitumen and therefore for its final application, such as asphalt mixtures for roads, parking lots or airport runaways, tack coats, cheap seal, surface dressing, surface impregnation, roof-coatings, or roofing membranes, and waterproofing in general, as well as bituminous adhesive compositions.

The present invention has the advantage that the process of adding a component capable of forming a supramolecular assembly to the bitumen is done at similar temperatures at which the pure bitumen is stored. The incorporation of such a component into the bitumen is considerably simpler than in conventional polymer-modified bitumen due to its low viscosity at high temperatures. Substantially lower temperature, shorter mixing times under mild to low shear conditions are required for its dispersion in bitumen, as compared to conventional polymer modified bitumen. The presented invention does not require any other chemical compound, such as catalyst or crosslinking agents to achieve the enhancement of the mechanical properties at application conditions, although some might be added, as well as other conventional additives, where appropriate.

The bituminous composition of the present invention contains a component capable of forming a supramolecular assembly. This means that the above said component, as an isolated object, contains an assembly of molecules held together with physical bonds. In this invention, the physical bonds give to the component capable of forming a supramolecular assembly the properties of a polymer, a glass transition temperature and an elastic behaviour with deformations of 1% or more. These properties are measured on the above said component alone. Hence, in this invention the supramolecular assembly is called a supramolecular polymer. The bituminous composition of the present invention has the structure of a dispersion or a solution. By dispersion is meant a two phase structure that can be seen with an optical microscope thanks to the difference of refractive indices, one phase being divided in the shape of spheres in the other phase, the interface between the two phases being sharp under the optical microscope. By a solution, we mean a monophasic object showing no sharp change of the refractive indice inside and hence no sharp shapes inside.

When the bituminous composition of the present invention has the structure of a dispersion, two situations are possible. In the first dispersion situation, the component capable of forming a supramolecular assembly is essentially present in the dispersed phase. It is possible that the dispersed phase also contains some components of the bitumen swelling the above said component. In the second dispersion situation, the component capable of forming a supramolecular assembly is essentially present in the continuous phase. It is possible that some components of the bitumen swell the above said component. In this situation, the dispersed phase is essentially bitumen. The two situations can be encountered depending on the dosage of the above said component and on the nature of the bitumen. It is important to adjust the structure of the bituminous composition to the application to optimize its performances. For example, bituminous compositions that are efficient for roofing applications advantageously comprise a dispersion of the swollen polymer in the continuous phase. For example, a dispersion with dispersed objects that are not homogeneously distributed reflects a poor storage stability.

DETAILED DESCRIPTION OF THE INVENTION

Figure 1:
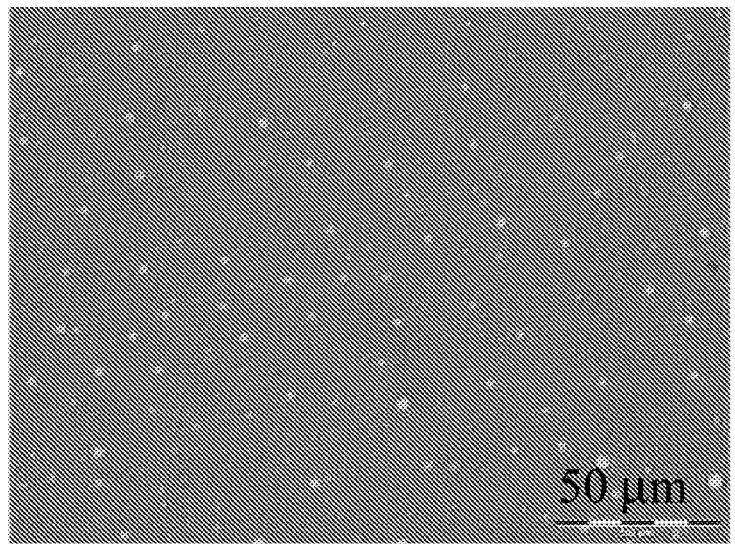
FIG. 1 is a picture of a typical morphology of the bituminous composition in the form of a dispersion, wherein the supramolecular polymer is dispersed within the bitumen (clear circles with sharp interfaces).

The bituminous composition of the present invention is in the form of a dispersion or a solution, and comprises at least one bitumen and at least one component capable of forming a supramolecular assembly. The content of the at least one component capable of forming a supramolecular assembly is preferably in the range of 0.05% to 20% by weight relative to the bitumen. Less than 0.05% of the at least one component capable of forming a supramolecular assembly would not lead to the expected effects. An amount of the at least one component capable of forming a supramolecular assembly higher than 20% is compatible with the aim of the present invention. This upper limit of 20% being set for economic purposes only. The expected effects would also be achieved with amounts of more than 20%, and even more than 30% or 40%.

By bitumen is meant a bituminous material coming from the distillation of oil under atmospheric or reduced pressure, the product coming from the extraction of tar and bituminous sands, the product of oxidation and/or fluxation of such bituminous materials, as well as blown or semi-blown bitumens, synthetic bitumens (such as described in FR 2 853 647), tars, oil resins or indene-coumarone resins mixed with aromatic and/or paraffinic hydrocarbons and the mixtures of such.

As herein before described, the component capable of forming a supramolecular assembly (supramolecular polymer) is incorporated into a bitumen to form the bituminous composition of the present invention.

Said supramolecular polymer is a supramolecular assembly having polymer-like properties: it has at least one glass transition temperature, generally between −100° C. and +50° C., and generally an elastic behaviour at 20° C. upon traction or shear at a deformation of 1% or higher. The glass transition temperature may be measured by several ways (see for example Brandrup, "The Polymer Handbook" $4^{th}$ edition, Wiley (1999; 2005)).

The elastic behaviour means the reversibility of the deformation upon stress increase and decrease, and may be characterized, for example, according to the experiments described in Ward and Hadley, "An introduction to mechanical properties of solid polymers", Wiley.

In addition, the supramolecular assembly is formed by the linkage of smaller molecules (i.e. components capable of forming said supramolecular assembly) by physical bonds instead of chemical bonds. Such linkage allows for at least a partial dissociation at elevated temperatures (typically above 100° C.), allowing easier dispersion into the bitumen at typical storage temperatures.

In particular, such physical bonds can be hydrogen bonds between similar or different functional groups present in the low molecular weight molecules. These hydrogen bonding functional groups may be covalently bonded one or multiple times on the low molecular weight molecule.

According to a preferred embodiment, the component capable of forming a supramolecular assembly that is present in the bituminous composition is in an amorphous state, whether the bituminous composition is a solution or a dispersion.

The amorphous state may be evidenced by various techniques, such as for example the one disclosed by L. C. Sawyer et al. in "Polymer Microscopy", Chapman & Hall, Second Edition 1996, pages 24-25 and 83-84: a probe is examined under an optical transmission microscope where the component capable of forming a supramolecular assembly is visible (uncolored or slightly coloured areas close to a brown environment). The probe is then enlightened using two linear light polarizers (visible light, 400-700 nm) arranged at an angle of 90°. In the amorphous state, the component capable of forming a supramolecular assembly is not visible any more because the light is not transmitted. This is due to the absence of birefringence of the components present inside the areas because said components are amorphous or isotropic.

Preferably, the bituminous compositions described in this invention comprise at least one component capable of forming a supramolecular assembly, which is the result from the reaction between:
(i) a, a functional group with the formula (1) to (4):

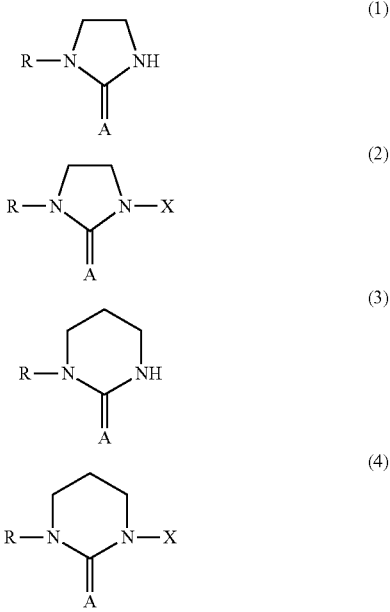

wherein
A is chosen from oxygen, sulfur or NH, preferably oxygen;
X represents a hydrocarbon group, preferably a substituted or non-substituted, linear or branched alkyl chain;
R represents a group containing a primary amine, secondary amine or hydroxyl functional group;
or
(i)b, A functional group with formula (5) or (6)

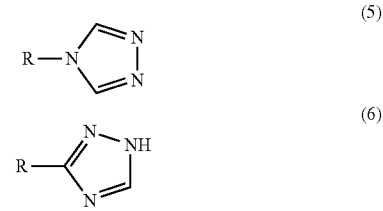

wherein
R represents a group containing a primary amine, secondary amine or hydroxyl functional group,
and (ii) at least one fatty acid monomer comprising at least one reactive group, and/or one identical or different fatty acid dimer and/or one identical or different fatty acid trimer or a derivate of a fatty acid such as a fatty acid ester or fatty acid chloride.

Preferably, the bituminous compositions described in this invention comprise at least one component capable of forming a supramolecular assembly, which is a supramolecular polymer obtained from the reaction between 2-amino ethyl imidazolidin-2-one (herein called UDETA) and/or 3-amino-1,2,4-triazole, and a mixture of:

51 to 100 weight % of one or several identical or different fatty acid dimers and/or one or several identical or different fatty acid trimers; and 0 to 49% weight % of one or several identical or different fatty acid monomers and/or one or several identical or different fatty acid higher oligomers.

As used herein, a higher fatty acid oligomer has a larger molecular weight than the correspondent fatty acid trimer. Typically, they are the tetramers, pentamers, etc. of the fatty acid.

The hydrogen bonds in the supramolecular polymer take place between two identical or different functions chosen between those shown in (1) to (6). The carbon atoms in the structures (1) to (6) may be substituted.

Certain molecules having at least a functional group from (1) to (4) correspond to the reaction of urea with a component comprising $NH_2$ or NH functions separated by 2 or 3 carbon atoms, more precisely, from the reaction of urea with alkylene amines, amines, amino alcohols or amido amines. Examples of the result of the reaction of the urea with a polyalkylamine are the:

UDETA: 2-aminoethylimidazolidin-2-one or 1-(2-aminoethyl)imidazolidin-2-one, coming from the reaction of urea and diethylene triamine (DETA);

UTETA: 1-(2-[(2-aminoethyl)amino]ethyl)imidazolidin-2-one, coming from the reaction of urea and triethylene tetramine (TETA);

UTEPA: 1-(2-{2-[(2-aminoethylamino]ethyl}amino) ethyl]imidazolidin-2-one, coming from the reaction of urea and tetraethylene pentamine (TEPA).

Other examples of molecules with structure as those shown in (1) to (4) are those from the reaction of urea or thiourea with:

dodecanediodic, brassylic, tetradecanedioic, pentadecanedioic, thapsic, or octadecanedioic acids, branched diacids like 3,3-dimethylglutaric acid and more preferably the dimer and trimer containing fatty acid mixtures resulting from the oligomerization of unsaturated fatty acids from vegetal origin such as undecylenic, myristoleic, palmitoleic, oleic, linoleic, linolenic, ricinoleic, eicosenoic or docosenoic acids (found on pine, corn, sunflower, soja, raisin seeds, linen or jojoba) or animal origin like eicosapentaenoic or docosahexaenoic acids (found in fish oils).

As preferred examples of fatty acids, mention may be made of the fatty acids comprising unsaturated molecules, for example of the oleic type that is oligomerized by a condensation reaction of the double bonds. This reaction results in blends that essentially comprise dimers and trimers. By fatty acid dimers and trimers it is understood the oligomers of 2 or 3 identical or different monomers. Advantageously, these fatty acids, saturated or unsaturated, comprise 12 to 100 carbon atoms and more advantageously 24 to 90.

Blends of fatty acids oligomers comprise, in general, a given ratio of fatty acid dimers and trimers. The proportion of fatty acid monomer and higher oligomers (tetramers, pentamers, etc. . . . ) is low in comparison of the proportion of fatty acid dimers and trimers. Additionally, the dimer/trimer ratio of a fatty acid blend have an influence over the supramolecular polymer used in the invention, such as the amount of crystallinity and the crystallization kinetics.

Examples of a fatty acid dimer and a trimer are shown below, representing the cyclic dimer and trimer from the fatty acid with 18 carbon atoms, $C_{18}$. It is to be noted that the commercial products are blends of isomers of such compositions, including also partially or totally hydrogenated structures.

Cyclic fatty acid dimer $C_{18}$

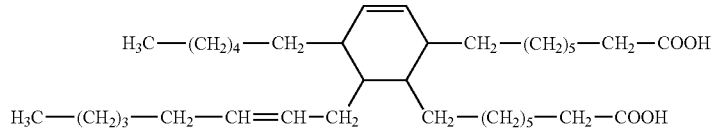

Cyclic fatty acid trimer $C_{18}$

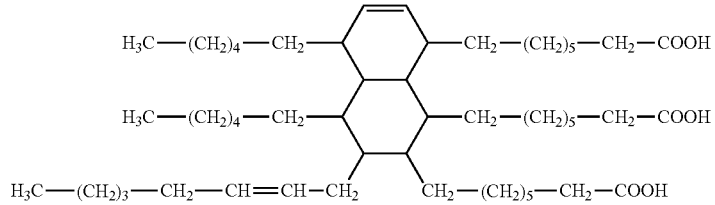

different polyamines such as dipropylene triamine, di (1,2-butylenes) triamine, di (2,3-butylenes) triamine, N-methyldiethylenetriamine, N-ethyldiethylenetriamine and tripropylenetetramine;

amino alcohols such as 2-[(2-aminoethyl)amino]ethanol.

Among the molecules with the structure as shown in (5), an example is 4-amino-1,2,4-triazole. Among the molecules with the structure as shown in (6), an example is 3-amino-1, 2,4-triazole.

Examples of fatty acids that may be used for this reaction are the saturated or unsaturated carboxylic acids with at least 5 carbon atoms such as linear monoacids like lauric, mystiric, oleic, stearic, linoleic or linolenic acids, branched monoacids like 2-ethyl hexanoic acid, linear diacids such as glutaric, adipic, pimelic, suberic, azelaic, sebacic, undecanedioic, A preferred blend of fatty acid oligomers contains dimers, trimers and monomers of the $C_{18}$ fatty acid (linear of cyclics), with a major composition of dimer and trimers and a minor composition of monomer.

A still preferred blend comprises:

0.1 to 40% in weight, more preferably from 0.1 to 10 wt % of identical or different fatty acid monomers;

0.1 to 99.8% in weight, more preferably from 18 to 98 wt % of identical or different fatty acid dimers; and 0.1 to 85% in weight, more preferably from 2 to 70 wt % of identical or different fatty acid trimers.

Commercial examples of such dimer and trimer fatty acid mixtures are: the Uniquema products Pripol® 1017, Pripol® 1048, Pripol® 1013, Pripol® 1040, Pripol® 1009 and Pripol® 1006, the Arizona chemicals products Unidyme® 60, Unidyme® 40 and Unidyme® 14, the Cognis products Empol® 1008, Empol® 1018, Empol® 1043, Empol® 1045, Empol® 1016 and the products from Oleon, such as Radiacid® 0980. These products, Pripol®, Unidyme®, Empol®, and Radiacid®, comprise fatty acid monomers of $C_{18}$ and fatty acid oligomers multiples of $C_{18}$.

The supramolecular polymers used in the invention may also result from the reaction of structures (1) to (6) with a fatty acid derivate such as a fatty acid ester or fatty acid chloride. A preferred fatty acid ester is a fatty acid methyl ester, in particular a fatty acid methyl ester of a fatty acid dimer or a mixture of fatty acid oligomers as described above. An example of a fatty acid chloride can be the sebacoyle chloride.

As an example of a semi-crystalline supramolecular polymer used in the invention, mention may be made of the polymer with the following structure, which is obtained from the reaction of a fatty acid dimer and UDETA:

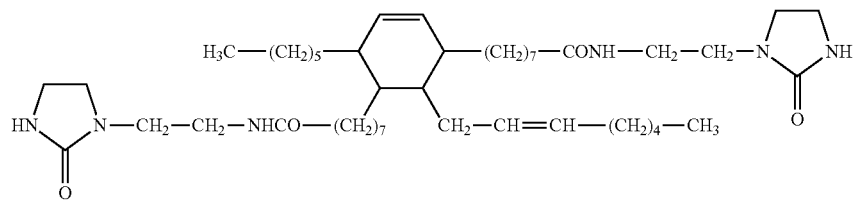

Other examples of supramolecular polymers used in this invention are:

the Supra 1008, obtained from the reaction of Empol® 1008 and UDETA;

the Supra 1060, obtained from the reaction of Unidyme® 60 and UDETA;

the Supra 1008/1060, obtained from the reaction of Empol® 1008, Unidyme® 60 and UDETA;

the Supra 1017, obtained from the reaction of Pripol® 1017 and UDETA;

the Supra 1040, obtained from the reaction of Pripol® 1040 and UDETA;

the Supra 1048, obtained from the reaction of Pripol® 1048 and UDETA;

the Supra 1014, obtained from the reaction of Unidyme® 14 and UDETA;

the Supra 0980, obtained from the reaction of Radiacid® 0980 and UDETA.

Another variable in the synthesis of the supramolecular polymer used in this invention, that generally influences the thermomechanical properties of the supramolecular polymer as well as the bituminous compositions containing it, is the stoichiometric proportion between molecules (1) to (6) and the fatty acid blends. For example, in the case of the UDETA molecule, the number of reactive amine groups with the fatty acids can be adjusted to be in stoichiometric proportions, meaning one amine (or UDETA molecule) for each acid group in the fatty acid or in non-stoichiometric proportions, meaning an excess or shortage of amine (UDETA molecules) for each acid group. As an example, the ratio between the number of (1) structures and the number of acid groups in the fatty acid monomers, dimers or trimers is between 0.2 and 2.

The preferred supramolecular polymers for the bituminous compositions described in this invention, resulting from the reaction of UDETA and a mixture of fatty acids (containing dimers and trimers), generally are of a semi-crystalline nature with melting temperatures from about 30° C. to 150° C. and a glass transition temperature of between −50° C. and 30° C.

Bituminous compositions comprising non-crystalline supramolecular polymers with elastic properties such as described in WO 2006/087475 are also part of the present invention.

According to another embodiment of the present invention, the at least one component capable of forming a supramolecular assembly is chosen from conventional polymers modified with an average of at least of one hydrogen-bonding functional group per conventional polymer molecule. The conventional polymer may be linear, branched or chemically crosslinked. By conventional polymers it is understood for the purpose of the present invention, those formed by molecules comprising two or more repeat units, whether identical or not, linked by covalent bonds, and having a molecular weight of at least 500 daltons. Non limiting examples of conventional polymers are: polybutadiene, poly isoprene, poly chloroprene and their hydrogenated versions, polyisobutylene, bloc copolymers of polybutadiene and isoprene with styrene, and their hydrogenated versions like poly styrene-b-butadiene (SB), poly styrene-b-butadiene-b-styrene (SBS), poly styrene-b-isoprene-b-styrene (SIS), poly styrene-b-(isoprene-stat-butadiene)-b-styrene or poly styrene-b-isoprene-b-butadiene-b-styrene (SIBS), hydrogenated SBS (SEBS), poly styrene-b-butadiene-b-methyl methacrylate (SBM), its hydrogenated version (SEBM), poly methyl methacrylate-b-butylacrylate-b-methyl methacrylate (MAM), poly styrene-b-butyl acrylate-b-styrene (SAS), statistic copolymers of butadiene with styrene (SBR) and acrylonitrile (NBR) and their hydrogenated versions, butyl rubber or halogenated one, polyethylene, polypropylene, ethylene-vinyl alcohol copolymer, ethylene-propylene copolymer and ethylene-propylene-diene copolymer (EPDM), copolymers of ethylene with acrylic monomers, copolymers of ethylene and acrylic esters, copolymers of ethylene, acrylic ester, maleic anhydride, copolymers of ethylene, acrylic ester, functionalised acrylic ester like glycidyl acrylate or methacrylate, available by the ARKEMA company under the brand name LOTADER®, acrylic or methacrylic polymers or copolymers like the resins based on (meth)acrylic esters such as poly butyl acrylate and its copolymers with styrene, methyl methacrylate or other acrylic monomers, as well as their mixtures.

Preferably the hydrogen-bonding functional group present in such conventional polymer is chosen form the hereinbefore described functional groups 1 to 6 that are directly reacted on the conventional polymer or reacted on a monomer capable of copolymerizing with the monomers of the conventional polymer.

The bituminous composition of the present invention may be in the form of an aqueous emulsion, the amount of water generally ranging from 10 to 70 vol % of the total volume of the emulsion.

The bituminous composition of the present invention offers a unique advantage over regular polymer modified bitumens in their preparation process. Normally, the dispersion of a regular polymer in bitumen requires heating the bitumen to temperatures higher than their normal storage temperatures (by about 20° C.) and long mixing times (usually hours) under medium to high shear conditions. In contrast, the preparation process for the present invention can be carried out at temperatures much closer to those at which the pure bitumen is regularly stored and in significantly shorter times (minutes) under mild to low shear conditions. No crosslinking agent is necessary to avoid phase separation.

The bituminous composition of the present invention may also comprise one or several other components, such as those commonly used in the field of bitumen and asphalts. Examples of such other component(s) are anti-stripping agents (adhesion enhancers). Non-limiting examples of such anti-stripping agents are: alkylcarboxilic acids, products with a compound of formula R—O—$((CH_2CH(CH_3)O)_a$—$(CH_2CH_2O)_b)_cP(=O)$—$OH_d$ (herein after referred to as product A) where P is phosphorous, c is between 1 and 2, c+d equals 3, a is between 0 and 3, b is between 0 and 6 and R represents an hydrocarbon chain with 6 to 30 carbon atoms, fatty acid esters of quaternary alkanol amines, alkyl amido polyamines, alkyl imidazolines and alkyl imidazo polyamines, the products from the reaction between polyamines and fatty carboxylic acids, the products from the reaction between alkylpolyamines and fatty carboxylic acids, and in a similar manner, the products from the reaction between fatty acids or vegetal oil and diethanolamine, followed by the reaction with polyamines.

Non-limiting examples of quaternary alkanol amines are betain salts and N,N,N-trialkyl choline salts with strong organic or inorganic acids, such as for example (methane) sulphonic acid. The polyamines are, as non-limiting examples, dimethyl amino propylamine, N-amino ethyl piperazine, diethylene triamine, triethylene tetramine and tetraethylene pentamine.

Other examples of possible additional component(s) in the bituminous composition are paraffins, for example Fischer-Tropsch paraffins described in U.S. Pat. No. 6,588,974, anti-stripping agents, esters of fatty acids and functionalized wax, dialkyldiamides as for example those cited in WO 2007/073378, fluxants, regular polymers, such as polyethylene, styrene/butadiene copolymers, or ethyl vinyl acetate copolymers, oils from vegetal or mineral sources and their derivatives, polyphosphoric acid, orthophosphoric acid, pyrophosphoric acid. Further examples are the following additives:

A) product A as herein before described;
B) reaction product(s) of (di)alk(en)ylphenols with aldehydes, said aldehydes having from 1 to 10 carbon atoms and more particularly from 1 to 5 carbon atoms, and even more particularly paraformaldehyde or acetaldehyde, followed with (poly)oxyethylation and/or (poly)oxypropylation, the alk(en)yl groups having from 1 to 50 carbon atoms, preferably from 2 to 20 carbon atoms, and more preferably from 3 to 12 carbon atoms, the dialk(en)ylphenols possibly being identical or different, the unit resulting from (poly)oxyethylation and/or (poly) oxypropylation having a molecular weight equal to or greater than 45 g/mol and less than 20,000 g/mol, the number of phenolic units in the component A ranging from 3 to 50;
C) (poly)oxyethylated and/or (poly)oxypropylated 2,2-bis (4-hydroxyphenyl) propane-epichlorohydrine copolymer, the unit resulting from (poly)oxyethylation and/or (poly)oxypropylation having a molecular weight equal to or greater than 45 g/mol and less than 20,000 g/mol;
D) (poly)oxyethylated and/or (poly)oxypropylated bis(4-hydroxyphenyl)ethane-epichlorohydrine copolymer, the unit resulting from (poly)oxyethylation and/or (poly)oxypropylation having a molecular weight equal to or greater than 45 g/mol and less than 20,000 g/mol;
E) (poly)oxyethylated and/or (poly)oxypropylated bis(4-hydroxyphenyl)methane-epichlorohydrine copolymer, the unit resulting from (poly)oxyethylation and/or (poly)oxypropylation having a molecular weight equal to or greater than 45 g/mol and less than 20,000 g/mol;
F) the reaction product of (poly)oxyethylation and/or (poly)oxypropylation of an alkyldicarboxylic acid or mixtures thereof, the alkyl groups having from 1 and 20 carbon atoms, preferably from 1 to 10 carbon atoms, all the units resulting from (poly)oxyethylation and/or (poly)oxypropylation having a molecular weight equal to or greater than 100 g/mol and less than 20,000 g/mol;
G) the reaction product of (poly)oxyethylation and/or (poly)oxypropylation of a fatty acid, the number of carbon atoms of which ranging from 10 and 30, said fatty acid being preferably tall oil fatty acid, the unit resulting from (poly)oxyethylation and/or (poly)oxypropylation having a molecular weight equal to or greater than 100 g/mol and less than 20,000 g/mol;
H) the reaction product of product B and the mixture of products F and G;
I) the salt from an alk(en)yl(aryl) sulfonic acid and an alk(en)yl(aryl)amine, the alk(en)yl(aryl) units having a number of carbon atoms ranging from 6 to 30, said salt preferably being the salt of dodecylbenzenesulfonic acid with tallow amine, or the salt of dodecylbenzenesulfonic acid with cyclohexylamine;
J) the salt from an alk(en)yl(aryl) sulfonic acid and morpholine, pyrazine, pyrazoline, pyrazolone, pyridine, pyridine, pyrimidine, pyrrole, pirrolidine, pyrolidone, pyrroline, toluidine, imidazole, indol, indoline or oxindole, the alk(en)yl(aryl) groups having from 6 to 30 carbon atoms, said salt preferably being the salt of dodecylbenzenesulfonic acid with morpholine;
K) the statistical or block copolymer(s) of ethylene oxide and propylene oxide with a molecular weight between 500 g/mol and 20,000 g/mol and their mixtures, with a mass ratio (ethylene oxide/copolymer) between 1% and 70%.

All these other components and additives can be added to the bituminous compositions by any known means. Generally, the amount of said other components and additives are present in the bituminous composition of the present invention in an overall amount ranging from 0.01% to 20% by weight to the total mass of the bituminous composition. The addition of the at least one component capable of forming a supramolecular assembly to the bituminous composition containing one or several components mentioned in the previous paragraph enables to increase one or several properties of the composition, like for example elastic character, stiffness, resistance to fatigue, resistance to low temperature craking, resistance to rutting, flexibility at low temperature, fluidity above 100° C., storage stability above 100° C., hydrophobicity.

In another aspect, the present invention relates to the process for the preparation of a bituminous composition comprising at least one component capable of forming a supramolecular assembly comprising the steps of:
adding either in a solid, melted, dissolved or dispersed state said component capable of forming a supramolecular assembly to the bitumen at similar or lower temperature at which it is regularly stored,
optionally adding one or more additives, such as those described herein before, where the order of addition between them and the said component capable of forming a supramolecular assembly is irrelevant.

mixing, preferably under mild agitation, by any mechanical means during a period of time sufficient for obtaining an homogenous mixture, said period of time generally ranging from 1 minute to several hours, typically from 1 minute to 60 minutes, and obtaining a bituminous composition ready to use.

The bituminous composition obtained according to the above process may be used as such or mixed with mineral aggregates to yield asphalts mixtures.

According to another embodiment, the at least one component capable of forming a supramolecular assembly in a melted or dissolved state may be added to a continuous flow of the bitumen by any know means, like for example using a direct injection or a direct injection and a static mixer.

In another aspect, the here-above process is carried out to yield an aqueous emulsion of bitumen comprising the at least one component capable of forming a supramolecular assembly. In such a case, the bituminous composition is mixed with a water phase using a static mixer or a mixer with moving parts or a combination of both of them.

According to another aspect, the present invention relates to a formulation comprising at least one component capable of forming a supramolecular polymer, the formulation being in the form of a dispersion or a solution, such as described above, and at least one or more additives, such as those listed herein before, typically chosen from among anti-stripping agents, paraffins, for example Fischer-Tropsch paraffins described in U.S. Pat. No. 6,588,974, esters of fatty acids and functionalized wax, dialkyldiamides as for example those cited in WO 2007/073378, fluxants, regular polymers, oils from vegetal or mineral sources and their derivatives, polyphosphoric acid, orthophosphoric acid, pyrophosphoric acid, as well as from among one or more of the additives referred to A to K above.

Such formulation may be in the form of a one pack component or a two pack component. Where in the form of a one pack component, the formulation may be obtained by mixing the at least one component capable of forming a supramolecular assembly and the at least one additive as defined above.

The main application for the bituminous compositions presented in this invention is the fabrication of asphalt mixtures for the construction of roads, parking lots, airport runaways or any similar rolling surface, for roofing and more generally waterproofing. The resulting asphalt mixture fabricated with the bituminous composition as described in this invention has surprisingly enhanced mechanical properties.

Therefore, and according to still another aspect, the invention relates to a surface, which is coated in whole or in part with a bituminous composition as previously described and/or an asphalt mixture as defined above, said surface being generally a rolling surface, such as roads, parking lots, bridges, motorways, highways, airport runaways or any similar rolling surface, and also any surface requiring bituminous or asphalt coating, such as pavements, side walks, playgrounds, roofs, walls and the like.

The mineral aggregates used with the invention's bituminous composition to fabricate an asphalt mixture are not limited in chemical nature, shape or size and may be the products from quarries, aggregates recuperated from previous asphalt mixtures (reclaimed asphalt pavement, RAP for example defined in the French Standard AFNOR XP P98-135 from December 2001), products from building demolition and the mixture of any of the above. The asphalt mixture prepared with the bituminous composition presented in this invention may contain other common components of asphalt mixtures such as organic fibers (for example: cellulose, cotton, polypropylene, polyester, polyvinyl alcohol and polyamide fibers) and inorganic fibers (for example: glass, metal or carbon fibers).

In an embodiment of the invention, the bituminous composition is used for the known techniques of tack coat, cheap seal, in surface dressings, surface impregnation, roofing coating or membrane, waterproofing employing anhydrous bituminous composition or as an emulsion.

In another embodiment of the invention, the bituminous composition is comprised in an adhesive formulation.

The bituminous composition described in this invention may be used in any asphalt mixture fabrication methods such as those employing bituminous emulsion addition, anhydrous bitumen addition, or any of the several processes for warm or semi-warm mixture fabrication (where fabrication temperature is above room temperature but below that in regular hot mixing process), like the bitumen foaming techniques, for example US 2008/00259714 which uses a special foaming device associated with a multistep heating and drying and mixing device, U.S. Pat. No. 5,910,212 and WO 97/20890 which use a hard bituminous binder combined to the mixture of a soft bituminous binder and aggregates, or US 2005/0076810 which uses a high desorption capacity additive, or EP 1 469 038 in which a part of the aggregates is heated and dried and mixed with bitumen and then after mixed with wet aggregates, or US 2006/00236614 in which the aggregates are dried and mixed with bitumen but with the drying step so that a fraction of the initial humidity of the aggregates remains, or WO 07/112,335 which uses a water in oil bitumen dispersion with selected surfactants, or U.S. Pat. No. 6,588,974 which uses a Fischer-Tropsch paraffin added into the bitumen, in conjunction or in partial or total replacement of the bitumen mentioned.

The bituminous composition described in the present invention provides advantages over conventional water/bitumen or bitumen/water emulsion fabrication processes with regular polymer modified bitumens. Identical viscosity at lower temperature allows for the preparation of emulsion with modified bitumen owing to this invention at lower temperatures and pressure. Lower penetration grades of bitumen can be used.

According to another aspect, the present invention relates to the process for the preparation of an asphalt mixture, where the at least said component capable of forming a supramolecular assembly in a solid, melted, dissolved or dispersed state is added to the mineral aggregates before, at the same time or after the bitumen or bituminous composition according to claim 1 is added into the mixing process.

This applies also to the other components and additives that may be added to the asphalt composition: anti-stripping agents, paraffins, for example Fischer-Tropsch paraffins described in U.S. Pat. No. 6,588,974, esters of fatty acids and functionalized wax, dialkyldiamides as for example those cited in WO 2007/73378, fluxants, regular polymers, oils from vegetal or mineral sources and their derivatives, polyphosphoric acid, orthophosphoric acid, pyrophosphoric acid, components A to K.

The above process for the preparation of an asphalt mixture may advantageously be carried out where the bituminous composition of the invention is in the form of an aqueous emulsion.

The present invention also offers several advantages to the fabrication, laying and compaction of asphalt mixtures produced by hot mixing. Fabrication of an asphalt mixture with the invention by hot mixing can be carried out at similar temperatures to those usually used with the pure bitumen. This is not generally possible with regular polymer modified bitumens since a considerable increase in viscosity takes place when it is cooled from the preparation temperature to the temperature at which the pure bitumen is usually stored (about 20° C. difference). An increase in viscosity leads to a difficult or incomplete coverage of the mineral aggregate by the modified bitumen. This increase in viscosity would also have a negative impact on the laying and compaction of the asphalt mixture. In asphalt mixtures fabricated with the bituminous composition presented in this invention, no particular problem related with an increase in viscosity would take place since it remains similar to those of pure bitumen at fabrication, laying and compaction temperatures. In addition asphalt mixture fabrication with the bituminous composition presented in this invention may be carried out at temperatures even below those usually practiced with pure bitumen, for example below those at which the pure bitumen is commonly stored. Such asphalt mixtures may also be laid and compacted at lower temperatures, presenting better fluidity than those fabricated with regular polymer modified bitumen while still enhancing the mechanical properties of the mixture at final application conditions.

The reduction in the fabrication temperature by using the bituminous compositions of the invention would have as consequence a reduction in the consumed energy during asphalt mix fabrication since the mineral aggregates do not have to be heated as much as in the fabrication with regular modified bitumen. In addition, this reduction of energy also implies a reduction in $CO_2$ and other greenhouse effect gas emissions, and a reduction in bitumen and polymer oxidation.

Another advantage of the invention when used to fabricate an asphalt mixture is its ease of recycling compared with those fabricated with regular polymer modified bitumen, particularly to those that are chemically cross-linked, because once reheated the asphalt mixture comprising the bituminous composition of the present invention have a better fluidity at the same temperature, facilitating the handling, flow, mixing and compacting steps.

EXAMPLES

Preparation Example of Supramolecular Polymer Supra 1017

In this example is presented the preparation of supramolecular polymer Supra 1017.

Introduced into a glass reactor equipped with a variable speed stirrer motor, with inlets for introducing reactants, for introducing inert gases, such as nitrogen, and for measurement probes (e.g., temperature probe), with a vapour condensation/extraction system which could be connected to a vacuum-producing system (vacuum pump, vacuum traps, etc.), and a jacket enabling the contents of the reactor to be heated/cooled by circulating inside it a heat-transfer fluid, such as oil, coming from a thermostated bath, were 145 g of PRIPOL® 1017 acid dimer/trimer, of 193.4 acid number (mg KOH/g of product necessary to neutralize the acid groups), and the mixture was heated to 60-80° C. with stirring. Then 161 g of 2-aminoethylimidazolidinone (UDETA) of around 88% molar purity which had been preheated (to around 60° C.) were slowly introduced, and homogenized by stirring. The reaction medium was then brought to 160° C. so as to bring about the amine (of UDETA)-acid (of fatty acid dimer/trimer mixture) reaction while extracting the condensation water, especially by flushing the top of the reactor with nitrogen.

The reaction was left to proceed for 16 hours, after which the reaction medium was cooled. The supramolecular polymer Supra 1017 was then obtained. The solidification point of the product was located at 61° C., the residual acid number obtained was 1.49, and a $T_g$ of −15 to 10° C., determined using a DSC Q10 machine from TA Instruments.

The other supramolecular polymers are obtained according similar methods.

Example 1

The complex viscosity, storage modulus, G', and loss modulus, G", of two different supramolecular polymers, Supra 1017 and Supra 1040 obtained from the reaction of UDETA and different mixtures of dimer and trimer fatty acids were measured using a dynamical shear rheometer. Values for such parameters at 0.2 Hz at 140° C. and 25° C. are presented on Table 1. The value of a pure TOTAL bitumen with a penetration grade of 160/220 is also shown for comparison. It can be observed that the viscosity of the supramolecular polymers is not so different to that of pure bitumen at high temperatures, which allow their ease of mix. It can also be observed that the values for the modulus at room temperature are at least an order of magnitude higher than that of bitumen.

TABLE 1

|  | Viscosity (Pa s) 140° C. | G" (MPa) 140° C. | G' (MPa) 140° C. | Viscosity (Pa s; 25° C.) | G" (MPa) 25° C. | G' (MPa) 25° C. |
| --- | --- | --- | --- | --- | --- | --- |
| 160/220 Bitumen | 0.18 | $3.2 \times 10^{-7}$ | — | $2.1 \times 10^4$ | $2.7 \times 10^{-3}$ | $2.1 \times 10^{-2}$ |
| Supra 1017 | 0.66 | $8.3 \times 10^{-7}$ | — | $8.5 \times 10^6$ | 1.1 | 2.3 |
| Supra 1040 | 0.50 | $6.3 \times 10^{-7}$ | — | $4.7 \times 10^5$ | $9.4 \times 10^{-2}$ | 0.6 |

Example 2

The preparation of a supramolecular polymer modified bitumen was carried out by adding 5 parts of Supra 1017 in solid form into 100 parts of a TOTAL bitumen with a penetration of 160/220. The bitumen was previously heated to 140° C. and kept at that temperature under mild stirring conditions (about 100 RPM) during the addition of the Supra 1017. Once the Supra 1017 was added, the mixture was stirred for 15 minutes to obtained a homogenous mixture.

Example 3

The storage modulus, G', and loss modulus, G", of two different supramolecular polymer modified bitumen compositions prepared as in example 2, were measured using a dynamical shear rheometer. Values for such parameters at 0.2 Hz at 60, 40 and 25° C. are shown on Table 2. Compositions 1, 2 and 3 were prepared by adding 2%, 5% and 10% of Supra 1017 into 160/220 bitumen respectively. Compositions 4, 5 and 6 were prepared by adding 2%, 5% and 10% of Supra 1040 into 160/220 bitumen respectively. As a comparison, a commercial polymer modified bitumen (PMB-SBS) provided by the Malet company, is a bitumen from TOTAL with a penetration grade of 160/220 modified with 2% of sulfur-crosslinked styrene-butadiene block copolymer.

It can be observed that Supra 1017 and Supra 1040 compositions improve the modulus values with respect to pure bitumen. It can also be seen that at the highest concentration of Supra 1017, composition 3, there is a decrement in the modulus values at 25° C. with respect to composition 2. This is not the case for compositions with Supra 1040, although the increment in modulus values at 25° C. from 5% to 10% is less significant than those obtained with lower quantities of Supra 1040 (from 0% to 2% for example). This shows that the practical amount of supramolecular polymer that can be added into the bituminous composition for mechanical properties enhancement is limited on the upper bound. This compositional limit may change as a function of the bitumen grade and supramolecular polymer used.

TABLE 2

|  | G' (MPa) 60° C. | G' (MPa) 40° C. | G' (MPa) 25° C. | G" (MPa) 60° C. | G" (MPa) 40° C. | G" (MPa) 25° C. |
|---|---|---|---|---|---|---|
| 160/220 Bitumen | $2.6 \times 10^{-7}$ | $4.5 \times 10^{-5}$ | $2.7 \times 10^{-3}$ | $6.5 \times 10^{-5}$ | $1.2 \times 10^{-3}$ | $2.1 \times 10^{-2}$ |
| Composition 1 | $4.2 \times 10^{-7}$ | $5.3 \times 10^{-5}$ | $3.0 \times 10^{-3}$ | $7.0 \times 10^{-5}$ | $1.3 \times 10^{-3}$ | $2.3 \times 10^{-2}$ |
| Composition 2 | $1.5 \times 10^{-6}$ | $6.0 \times 10^{-5}$ | $3.2 \times 10^{-3}$ | $7.4 \times 10^{-5}$ | $1.3 \times 10^{-3}$ | $2.4 \times 10^{-2}$ |
| Composition 3 | $4.2 \times 10^{-6}$ | $7.3 \times 10^{-5}$ | $2.8 \times 10^{-3}$ | $7.3 \times 10^{-5}$ | $1.2 \times 10^{-3}$ | $2.2 \times 10^{-2}$ |
| Composition 4 | $3.4 \times 10^{-7}$ | $6.3 \times 10^{-5}$ | $3.7 \times 10^{-3}$ | $7.8 \times 10^{-5}$ | $1.5 \times 10^{-3}$ | $2.6 \times 10^{-2}$ |
| Composition 5 | $5.5 \times 10^{-7}$ | $7.7 \times 10^{-5}$ | $3.9 \times 10^{-3}$ | $8.3 \times 10^{-5}$ | $1.6 \times 10^{-3}$ | $2.8 \times 10^{-2}$ |
| Composition 6 | $1.2 \times 10^{-6}$ | $8.3 \times 10^{-5}$ | $4.3 \times 10^{-3}$ | $9.3 \times 10^{-5}$ | $1.7 \times 10^{-3}$ | $3.1 \times 10^{-2}$ |
| PMB-SBS | $7.9 \times 10^{-7}$ | $9.0 \times 10^{-5}$ | $4. \times 10^{-3}$ | $7.7 \times 10^{-5}$ | $1.4 \times 10^{-3}$ | $2.3 \times 10^{-2}$ |

Example 4

An asphalt mixture was prepared using Composition 2 at 140° C. Mineral aggregates with a standard granulometry for the construction of pavements was used:

| Limestone filler | 1.5% |
| Sand 0/2 | 32.5% |
| Aggregate 2/6 | 25% |
| Aggregate 6/10 | 41% |

Composition 2 was prepared and mixed to the mineral aggregates at 140° C., as in a regular hot mixture asphalt fabrication process. The content of composition 2 in the asphalt mixture was 5.6% with respect of the aggregates. The resulting asphalt mixture was compacted using a gyratory press at 140° C. The compacted sample was then cool down and kept at constant temperature (20° C.) for 24 hours before testing.

A same reference sample using pure 160/220 bitumen and a comparison sample using polymer-modified bitumen with 2% of sulfur-crosslinked SBS were done in identical manner. Indirect tensile tests measurements were carried out on all samples using an Instron universal testing machine on compression at a 50 mm/min rate.

Values for elastic modulus, obtained from the compression curves are shown in Table 3. It can be clearly seen that in this case composition 2 has surprisingly a significantly higher modulus than the pure bitumen and also than the 2% styrene/butadiene comparison. It is to be noted that the 2% styrene/butadiene modified bitumen does not improve the mechanical performance of the pure bitumen at this conditions.

TABLE 3

|  | Pure 160/220 | Composition 2 | PMB-SBS |
|---|---|---|---|
| Modulus (MPa) | 72 | 143 | 66 |

Example 5

Asphalt mixtures using supramolecular polymer modified bitumens were carried out in non-standard conditions. Bitumen compositions 7, 8 and 9 were prepared by adding 5% of 3 different types of supramolecular polymers, Supra 1017, Supra 1040 and Supra 1048 respectively (which differ in the relation of dimer and trimer contents) The preparation process was similar as in example 2, but at a temperature of 130° C. (lower limit temperature for the storage of a 160/220 bitumen as recommended by Eurobitume). Same mineral aggregates and granulometry was used as in example 5.

The bitumen compositions were mixed to the mineral aggregates at 100° C., well below the standard hot mixture asphalt fabrication process. The content of bitumen composition in the asphalt mixture was 5.6% with respect of the aggregates. The resulting asphalt mixtures were compacted using a gyratory press at 80° C. The compacted samples were then cooled down and kept at constant temperature (20° C.) for 24 hours before testing.

A reference sample using pure 160/220 bitumen was done in identical manner. Indirect tensile tests measurements were carried out on all samples using an Instron universal testing machine on compaction at a 50 mm/min rate. Values for elastic modulus, obtained from the compression curves are shown in Table 4. It can be observed that all three compositions have a higher modulus than the reference. The value of modulus for these compositions, even under this severe fabrication and compaction conditions, are higher than those for pure and 2% of sulfur-crosslinked styrene/butadiene reference done at 140° C.

TABLE 4

|  | Pure 160/220 | Composition 7 | Composition 8 | Composition 9 |
|---|---|---|---|---|
| Modulus (MPa) | 59 | 111 | 141 | 108 |

Example 6

Another asphalt mixture was carried out using a non-traditional mixing process where the smaller aggregates (filler and 0/2) are wet (about 4% water content) and at 20° C. The rest of the aggregates are heated as for hot asphalt mixtures to the certain temperature below the standard asphalt fabrication temperature. The wet aggregates are added during the mixing of the bitumen and the hot aggregates.

A good coverage of the aggregates is obtained even while decreasing the fabrication temperature by water evaporation. The objective of this fabrication technique is to reduce the mixing temperature, reducing the energy consumed and the produced polluting emissions. In this example, a bitumen composition, 10, was prepared by adding only 0.3% of Supra 1017 to a bitumen with a penetration of 35/50.

The preparation process was similar to example 2 but carried at 160° C., which is a common fabrication temperature for bitumen with a penetration of 35/50. The content of bituminous composition in the asphalt mixture was 5.6% with respect of the aggregates.

The aggregate granulometry used was:

| | |
|---|---|
| Limestone filler | 1.5% (wet) |
| Sand 0/2 | 32.5% (wet) |
| Aggregate 2/6 | 25% |
| Aggregate 6/10 | 41% |

The bitumen composition 10 was mixed to the mineral aggregates (2/6 and 6/10) that were heated to 120° C., and at the same time mixed with the wet aggregates. The resulting asphalt mixture was compacted using a gyratory press at 100° C. The compacted sample was then cooled down and kept at constant temperature (20° C.) for 24 hours before testing.

A reference sample using pure 35/50 bitumen was done in identical manner. Indirect tensile tests measurements were carried out on all samples using an Instron universal testing machine on compaction at a 50 mm/min rate. Values for elastic modulus, obtained from the compression curves are shown in Table 5. It can be observed that even at such low concentrations of supramolecular additive, 0.3%, and non-standard fabrication conditions there is an augmentation on the modulus by using the compositions presented in this invention.

TABLE 5

| | Pure 35/50 | Composition 10 |
|---|---|---|
| Modulus (MPa) | 128 | 157 |

Example 7

The storage modulus, G', and loss modulus, G", of two different supramolecular polymer modified bitumen compositions prepared as in example 2, were measured using a dynamical shear rheometer. Values for such parameters at 1.6 Hz at 80, 60 and 40° C. are shown on Table 6. Composition 11 was prepared by adding 5% of Supra 1040 into a 50/70 bitumen. Composition 12 was prepared by adding 5 of a Supra 1040 based molecule, where the stoichiometric proportions between the UDETA and the fatty acid are not 100%, into a 50/70 bitumen. This supramolecular polymer, Supra 1040NS, has a shortage of 30% UDETA groups relative to the acid groups in the fatty acids. As a comparison the storage and loss modulus of the pure bitumen is also shown.

It can be observed that the composition 12, made with a non-stoichiometric supramolecular polymer, has a larger effect on the storage modulus at higher temperatures than composition 11, the stoichiometric supramolecular polymer. At lower temperature composition 11 has a small effect on the loss modulus, while composition 12 has practically no effect. This example shows that this variable in the synthesis of the supramolecular polymer used in this invention can modify positively the bituminous compositions containing it.

TABLE 6

| | G' (MPa) 80° C. | G' (MPa) 60° C. | G' (MPa) 40° C. | G" (MPa) 80° C. | G" (MPa) 60° C. | G" (MPa) 40° C. |
|---|---|---|---|---|---|---|
| 50/70 Bitumen | —[a] | $3.9 \times 10^{-5}$ | $5.1 \times 10^{-3}$ | $1.7 \times 10^{-4}$ | $1.6 \times 10^{-3}$ | $3.7 \times 10^{-2}$ |
| Composition 11 | —[a] | $4.4 \times 10^{-5}$ | $5.9 \times 10^{-3}$ | $1.8 \times 10^{-4}$ | $1.7 \times 10^{-3}$ | $4.1 \times 10^{-2}$ |
| Composition 12 | $2.5 \times 10^{-5}$ | $8.4 \times 10^{-5}$ | $5.5 \times 10^{-3}$ | $1.7 \times 10^{-4}$ | $1.6 \times 10^{-3}$ | $3.6 \times 10^{-2}$ |

[a]Value below instrument sensitivity.

Example 8

The storage modulus, G', and loss modulus, G" of different sections of a bitumen modified with a supramolecular polymer was measured using a dynamical shear rheometer. Values for such parameters at 0.2 Hz at 60, 40 and 25° C. are shown on Table 7. Composition 4 (as in example 3) was stored in a closed tubular container of 2 cm diameter and 20 cm in length in a vertical inside an oven at 160° C. for 3 days to check for any segregation of the polymer. After the 3 days the tube was cooled down and cut in three different section, bottom, middle and top, and measured for any difference in rheological behavior. As can be observed, the modulus for all the sections are very similar indicating that the supramolecular polymer in the bitumen remains well dispersed after a simple mixing after several days of storage. A typical morphology of the bituminous composition in the form of a dispersion is shown in FIG. 1 (optical microscopy), wherein the supramolecular polymer is dispersed within the bitumen (clear circles with sharp interfaces). Adding the two linear light polarizers arranged at an angle of 90°, the previously clear circles are not visible anymore, confirming their amorphous state.

TABLE 7

| | G' (MPa) 60° C. | G' (MPa) 40° C. | G' (MPa) 25° C. | G" (MPa) 60° C. | G" (MPa) 40° C. | G" (MPa) 25° C. |
|---|---|---|---|---|---|---|
| Composition 4 bottom | $4.3 \times 10^{-7}$ | $6.2 \times 10^{-5}$ | $3.7 \times 10^{-3}$ | $7.2 \times 10^{-5}$ | $1.4 \times 10^{-3}$ | $2.6 \times 10^{-2}$ |

TABLE 7-continued

|  | G' (MPa) 60° C. | G' (MPa) 40° C. | G' (MPa) 25° C. | G" (MPa) 60° C. | G" (MPa) 40° C. | G" (MPa) 25° C. |
|---|---|---|---|---|---|---|
| Composition 4 middle | $4.4 \times 10^{-7}$ | $6.5 \times 10^{-5}$ | $3.9 \times 10^{-3}$ | $7.2 \times 10^{-5}$ | $1.4 \times 10^{-3}$ | $2.6 \times 10^{-2}$ |
| Composition 4 top | $4.2 \times 10^{-7}$ | $6.3 \times 10^{-5}$ | $3.9 \times 10^{-3}$ | $7.3 \times 10^{-5}$ | $1.4 \times 10^{-3}$ | $2.7 \times 10^{-2}$ |

Example 9

Figure 2:
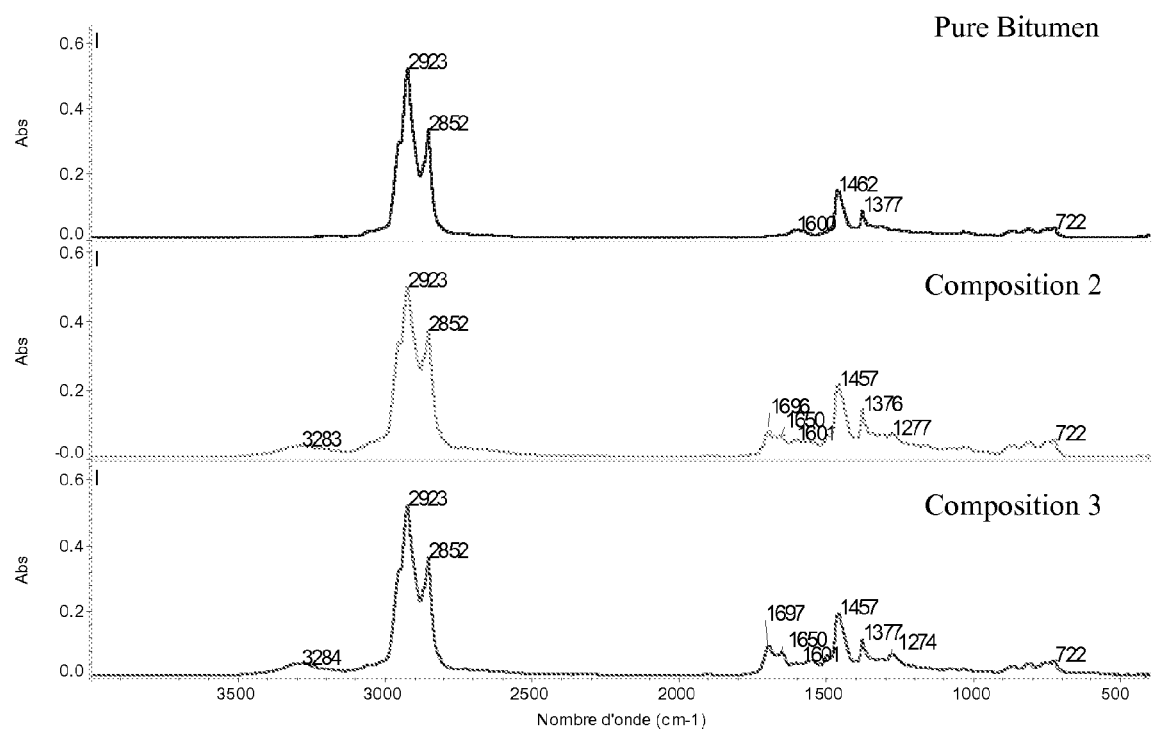
FIG. 2 shows the IR absorptions at each wavelength for Compositions 2 and 3 and the pure 160/220 bitumen.

Infrared spectroscopy analysis allows for qualitative and quantitative measurements of a Supra 1017 dispersed in bitumen as described in example 2. The modified bitumen was spread on a KBr window and measured for absorbance in wavelengths between 4000 cm$^{-1}$ to 500 cm$^{-1}$. Measurements were done on Compositions 2 and 3 as in example 3. FIG. 2 shows the IR absorptions at each wavelength for these two compositions and the pure 160/220 bitumen. Several characteristic signals of the supramolecular polymer Supra 1017 can be identified in compositions 2 and 3, for example at 3283, 1650, 1601 and 1277 cm$^{-1}$.

Example 10

In this example, a bitumen composition, 13, was prepared by adding 0.5% of Supra 1017 to a bitumen with a penetration of 50/70. The preparation process was similar to example 2. An asphalt mixture was prepared using Composition 13 at 140° C. Mineral aggregates with a standard granulometry for the construction of pavements was used:

| Limestone filler | 1.5% |
|---|---|
| Sand 0/2 | 35.5% |
| Aggregate 2/6 | 22% |
| Aggregate 6/10 | 41% |

Composition 13 was mixed to the mineral aggregates at 140° C., as in a regular hot mixture asphalt fabrication process. The content of composition 13 in the asphalt mixture was 5.5% with respect of the aggregates. The resulting asphalt mixture was compacted using a gyratory press at 140° C. The compacted sample was then cool down and kept at constant temperature (20° C.) for 24 hours before testing.

A same reference sample using pure 50/70 bitumen and a comparison sample using polymer-modified bitumen with 5% of ethylene/vinyl acrylate copolymer (EVA) were done in identical manner. Indirect tensile tests measurements were carried out on all samples using an Instron universal testing machine on compression at a 50 mm/min rate.

Values for the maximal force obtained during fracture testing, obtained from the compression curves are shown in Table 8. It can be clearly seen that in this case composition 13, with only 0.5% of Supra 1017, has surprisingly a significantly higher force to fracture than the pure bitumen, comparable to that achieved with 5% of EVA.

TABLE 9

|  | Pure 50/70 | Composition 13 (0.5% Supra 1017) | 5% EVA |
|---|---|---|---|
| Fracture Force (kN) | 33 | 38 | 36 |

The invention claimed is:

1. A bituminous composition, in the form of a dispersion or a solution, comprising at least one bitumen and at least one component capable of forming a supramolecular assembly, wherein the at least one component capable of forming a supramolecular assembly is a linear, branched or chemically crosslinked conventional polymer upon which at least an average of one hydrogen-bonding functional group per conventional polymer molecule is grafted.

2. A bituminous composition, in the form of a dispersion or a solution, comprising at least one bitumen and at least one component capable of forming a supramolecular assembly, wherein the at least one component capable of forming a supramolecular assembly is the result from the reaction between:

(i)a, a functional group with the formula (1) to (4)

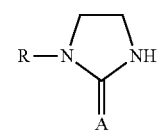

(1)

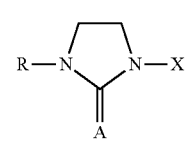

(2)

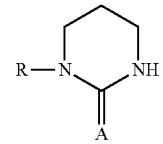

(3)

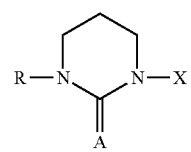

(4)

wherein

A is chosen from oxygen, sulfur or NH;

X represents a hydrocarbon group; or a substituted or non-substituted, linear or branched alkyl chain;

R represents a group containing a primary amine, secondary amine or hydroxyl functional group; or (i)b, A functional group with formula (5) or (6)

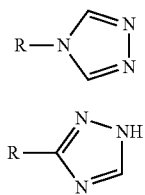

wherein
R represents a group containing a primary amine, secondary amine or hydroxy functional group;
and (ii) at least one fatty acid monomer comprising at least one reactive group, and/or one identical or different fatty acid dimer and/or one identical or different fatty acid trimer or a derivate of a fatty acid ester or fatty acid chloride.

3. A bituminous composition, in the form of a dispersion or a solution, comprising at least one bitumen and at least one component capable of forming a supramolecular assembly, wherein the at least one component capable of forming a supramolecular assembly is a supramolecular polymer obtained from the reaction between 2-amino ethyl imidazolidin-2-one (herein called UDETA) and/or 3-amino-1,2,4-triazole, and a mixture of:
51 to 100 weight % of one or several identical or different fatty acid dimers and/or one or several identical or different fatty acids trimers; and
0 to 49% weight % of one or several identical or different fatty acid monomers and/or one or several identical or different fatty acids higher oligomers.

4. The bituminous composition according to claim 1, wherein said at least one component capable of forming a supramolecular assembly is amorphous within said bituminous composition.

5. The bituminous composition according to claim 1, wherein the content of the at least one component capable of forming a supramolecular assembly is in the range of 0.05% to 20% by weight relative to the bitumen.

6. The bituminous composition according to claim 1, which is in the form of an aqueous emulsion, the amount of water generally ranging from 10 vol % to 70 vol % of the total volume of the emulsion.

7. A bituminous composition according to claim 1, further comprising one or more additives, selected from the group consisting of anti-stripping agents, paraffins, fluxants, regular polymers, oils from vegetal or mineral sources, esters or fatty acids and functionalized wax, dialkyldiamides, polyphosphoric acid, pyrophosphoric acid, orthophosphoric acid,
A) the product(s) with the formula $R-O-((CH_2CH(CH_3)O)_a-(CH_2CH_2O)_b)_cP(=O)-OH_d$ where P is phosphorous, c is between 1 and 2, c+d equals 3, a is between 0 and 3, b is between 0 and 6 and R represents an hydrocarbon chain with 6 to 30 carbon atoms:
B) the reaction product(s) of (di)alk(en)ylphenols with aldehyde, said aldehydes having 1 to 10 carbon atoms and more particularly from 1 to 5 carbon atoms, and even more particularly paraformaldehyde or acetaldehyde, followed with (poly)oxyethylation and/or (poly)oxypropylation, the alk(en)yl groups having 1 to 50 carbon atoms, the dialk(en)ylphenois possibly being identical or different, the unit resulting from (poly)oxyethylation and/or (poly)oxypropylation having a molecular weight equal to or greater than 45 g/mol and less than 20,000 g/mol, the number of phenolic units is the compound A ranging from 3 to 50;
C) (poly)oxyethylated and/or (poly)oxypropylated, 2,2-bis (4-hydroxyphenyl) propane-epichlorohydrine copolymer(s), the unit resulting from (poly)oxyethylation and/or (poly)oxypropylation having a molecular weight equal to or greater than 45 g/mol and less than 20,000 g/mol;
D) (poly)oxyethylated and/or (poly)oxypropylated bis(4-hydroxyphenyl)ethane-epichlorohydrine copolymer(s), the unit resulting from (poly)oxyethylation and/or (poly)oxypropylation having a molecular weight equal to or greater than 45 g/mol and less than 20,000 g/mol;
E) (poly)oxyethylated and/or (poly)oxypropylated bis(4-hydroxyphenyl)methane-epichlorohydrine copolymer(s), the unit resulting from (poly)oxyethylation and/or (poly)oxypropylation having a molecular weight equal to or greater than 45 g/mol and less than 20,000 g/mol;
F) the reaction product(s) of (poly)oxyethylation and/or (poly)oxypropylation of an alkydicarboxylic acid or mixtures thereof, the alkyl groups having 1 and 20 carbon atoms, all the units resulting from (poly)oxyethylation and/or (poly)oxypropylation having a molecular weight equal to or greater than 100 g/mol and less than 20,000 g/mol;
G) the reaction product(s) of (poly)oxyethylation and/or (poly)oxypropylation of a fatty acid, the number of carbon atoms of which ranging from 10 and 30, the unit resulting from (poly)oxyethylation and/or (poly)oxypropylation having a molecular weight equal to or greater than 100 g/mol and less than 20,000 g/mol;
H) the reaction product(s) of product B and the mixture of products F and G;
I) the salt(s) from an alk(en)yl(aryl) sulfonic acid and an alk(en)yl(aryl)amine, the alk(en)yl(aryl) units having a number of carbon atoms ranging from 6 to 30, a salt of dodecylbenzenesulfonic acid with tallow amine, a salt of dodecylbenzenesulfonic acid with cyclohexylamine;
J) the salt(s) from alk(en)yl(aryl) sulfonic acid and morpholine, pyrazine, pyrazoline, pyrazolone, pyridine, pyridine, pyrimidine, pyrrole, pirrolidine, pyrolidone, pyrroline, toluidine, imidazole, indol, indoline, or oxindole, the alk(en)yl(aryl) groups having from 6 to 30 carbon atoms, a salt of dodecylbenzenesulfonic acid with morpholine; and
K) the statistical or block copolymer(s) of ethylene oxide and propylene oxide with a molecular weight between 500 g/mol and 20,000 g/mol and their mixtures, with a mass ratio (ethylene oxide/copolymer) between 1% and 70%.

8. A process for the preparation of the bituminous composition of claim 1 comprising the steps of:
adding either in a solid, melted, dissolved or dispersed state said component capable of forming a supramolecular assembly to the bitumen at similar or lower temperature at which it is regularly stored,
optionally adding one or more additives,
mixing by any mechanical means during a period of time sufficient for obtaining an homogenous mixture, said period of time generally ranging from 1 minute to several hours, typically 1 minute to 60 minutes, and
obtaining a bituminous composition ready to use.

9. The process according to claim 8, which comprises adding
the at least one component capable of forming a supramolecular assembly in a melted or dissolved state to a continuous flow of the bitumen using a direct injection or a direct injection and a static mixer.

10. The process according to claim 8, wherein the bituminous composition is mixed with a water phase using a static mixer or a mixer with moving parts or a combination of both of them.

11. An asphalt mixture comprising at least one bituminous composition according to claim 1, and mineral aggregates.

12. A process for the preparation of the asphalt mixture according to claim 11, which comprises adding the at least one component capable of forming a supramolecular assembly in a solid, melted, dissolved or dispersed state to the mineral aggregates before, at the same time or after the bitumen or the bituminous composition into a mixing process.

13. The process according to claim 11, wherein the bituminous composition is in the form of an aqueous emulsion.

14. An adhesive formulation comprising at least one bituminous composition according to claim 1.

15. A surface coated in whole or in part with a bituminous composition according to claim 1 and/or an asphalt mixture comprising at least one bituminous composition according to claim 1.

16. The surface according to claim 15, which is a rolling surface.

* * * * *